United States Patent
Takahashi

(10) Patent No.: US 7,316,015 B2
(45) Date of Patent: Jan. 1, 2008

(54) METHOD, APPARATUS, AND PROGRAM FOR CONSTRUCTING AN EXECUTION ENVIRONMENT, AND COMPUTER READABLE MEDIUM RECORDING PROGRAM THEREOF

(75) Inventor: Eiji Takahashi, Hiroshima (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 10/370,668

(22) Filed: Feb. 24, 2003

(65) Prior Publication Data
US 2003/0163802 A1    Aug. 28, 2003

(30) Foreign Application Priority Data
Feb. 26, 2002    (JP)    ............... 2002-049197

(51) Int. Cl.
G06F 9/445    (2006.01)
G06F 9/45     (2006.01)
G06F 1/24     (2006.01)
G06F 3/00     (2006.01)

(52) U.S. Cl. ............ 717/177; 717/136; 713/100; 719/319

(58) Field of Classification Search .............. None
See application file for complete search history.

(56) References Cited

U.S. PATENT DOCUMENTS

| | | | |
|---|---|---|---|
| 6,018,628 A * | 1/2000 | Stoutamire | 717/147 |
| 6,247,128 B1 * | 6/2001 | Fisher et al. | 713/100 |
| 6,502,102 B1 * | 12/2002 | Haswell et al. | 707/102 |
| 6,601,236 B1 * | 7/2003 | Curtis | 717/177 |
| 6,823,478 B1 * | 11/2004 | Prologo et al. | 714/38 |
| 6,871,245 B2 * | 3/2005 | Bradley | 710/65 |
| 6,910,158 B2 * | 6/2005 | Jones et al. | 714/38 |
| 6,993,748 B2 * | 1/2006 | Schaefer | 717/124 |
| 2002/0010910 A1 * | 1/2002 | Crudele et al. | 717/4 |
| 2003/0065975 A1 * | 4/2003 | Tuttle | 714/33 |

FOREIGN PATENT DOCUMENTS

| | | |
|---|---|---|
| JP | 02-118871 | 5/1990 |
| JP | 09-101986 | 4/1997 |

OTHER PUBLICATIONS

Japanese Office Action (3 Pgs) mailed Sep. 26, 2006 in Japanese Application 2002-049197 which corresponds to the present U.S. Appl. No. 10/370,668.

\* cited by examiner

*Primary Examiner*—Wei Zhen
*Assistant Examiner*—Chih-Ching Chow
(74) *Attorney, Agent, or Firm*—Staas & Halsey LLP

(57) ABSTRACT

The present invention prepares the parameter conversion identification files as the definition information of parameter description for the execution environment setting files for use in a program development server and a connection test server, respectively. In the connection test server, a parameter conversion table is created on the basis of the parameter conversion identification files, and the execution environment parameters of the execution environment setting file acquired from the program development server are converted on the basis of the parameter conversion table to create an execution environment setting file suitable for its own apparatus. Using a location identification file, each file acquired from the program development server is copied into a designated directory to construct an execution environment for the connection test server.

6 Claims, 14 Drawing Sheets

| OS:Windows NT | | |
|---|---|---|
| | DIRECTORY NAME | FILE NAME |
| EXECUTION ENVIRONMENT | C:¥APW¥jbk3¥jdk¥bin | java |
| | C:¥APW¥jbk3¥jdk¥lib | tools.jar |
| | C:¥APW¥classes | js13022.jar |
| | C:¥APW¥classes | servlet22.jar |
| | C:¥APW¥classes | xml.jar |
| | C:¥APW¥classes | jscontainer.xml |
| LOCATION IDENTIFICATION FILE | C:¥webapl¥def | fileloc.txt |
| APPLICATION FILE | C:¥webapl¥classes | zaiko.jar |
| DATA FILE | C:¥webapl¥data | test.dat |
| EXECUTION ENVIRONMENT SETTING FILE | C:¥interstage¥servlet¥conf | jswatch.conf |
| PARAMETER CONVERSION IDENTIFICATION FILE | C:¥webapl¥def | paramdef.txt |

FIG.2A

| OS:Solaris | | |
|---|---|---|
| | DIRECTORY NAME | FILE NAME |
| EXECUTION ENVIRONMENT | /opt/FJSVawjbk/jdk13/bin | java |
| | /opt/FJSVawjbk/jdk13/lib | tools.jar |
| | /opt/FJSVjs2/classes | js13022.jar |
| | /opt/FJSVjs2/classes | servlet22.jar |
| | /opt/FJSVjs2/classes | xml.jar |
| | /etc/opt/FJSVjs2 | jscontainer.xml |
| LOCATION IDENTIFICATION FILE | /home/webapl/def | fileloc.txt |
| APPLICATION FILE | /home/webapl/classes | zaiko.jar |
| DATA FILE | /home/webapl/data | test.dat |
| EXECUTION ENVIRONMENT SETTING FILE | /home/webapl/opt/FJSVjs2 | jswatch.conf |
| PARAMETER CONVERSION IDENTIFICATION FILE | /home/webapl/def | paramdef.txt |

FIG.2B

| LOCATION IDENTIFIER | CONVER-SION FLAG | STORAGE DIRECTORY NAME | FILE NAME |
|---|---|---|---|
| javaexe | no | C:¥APW¥jbk3¥jdk¥bin | java |
| jdktool | no | C:¥APW¥jbk3¥jdk¥lib | tools.jar |
| js | no | C:¥APW¥classes | js13022.jar |
| servlet | no | C:¥APW¥classes | servlet22.jar |
| xml | no | C:¥APW¥classes | xml.jar |
| jcontainer | no | C:¥APW¥classes | jscontainer.xml |
| usr_pgm | no | C:¥webapl¥classes | zaiko.jar |
| usr_data | no | C:¥webapl¥data | test.dat |
| jswatch | yes | C:¥interstage¥servlet¥conf | jswatch.conf |
| PARAMDEF | no | C:¥webapl¥def | paramdef.txt |

FIG.3

| LOCATION IDENTIFIER | PARAMETER IDENTIFIER | PARAMETER |
|---|---|---|
| jswatch | jscontainer | containerconf=C:¥APW¥classes¥ |
| jswatch | jdk13bin | C:¥APW¥jbk3¥jdk¥bin¥ |
| jswatch | jdk13lib | C:¥APW¥jbk3¥jdk¥lib¥ |
| jswatch | apwclasses | C:¥APW¥classes¥ |
| jswatch | port | port=8009 |
| jswatch | userapl | C:¥webapl¥classes¥ |

FIG.4A

| LOCATION IDENTIFIER | PARAMETER IDENTIFIER | PARAMETER |
|---|---|---|
| jswatch | jscontainer | containerconf=/etc/opt/FJSVjs2/ |
| jswatch | jdk13bin | /opt/FJSVawjbk/jdk13/bin/ |
| jswatch | jdk13lib | /opt/FJSVawjbk/jdk13/lib/ |
| jswatch | apwclasses | /opt/FJSVjs2/classes/ |
| jswatch | port | port=9001 |
| jswatch | userapl | /home/webapl/user/classes/ |

FIG.4B

| LOCATION IDENTIFIER | PARAMETER IDENTIFIER | PROGRAM DEVELOPMENT SERVER PARAMETER | CONNECTION TEST SERVER PARAMETER |
|---|---|---|---|
| jswatch | jscontainer | containerconf=C:¥APW¥classes¥ | containerconf=/etc/opt/FJSVjs2/ |
| jswatch | jdk13bin | C:¥APW¥jbk3¥jdk¥bin¥ | /opt/FJSVawjbk/jdk13/bin/ |
| jswatch | jdk13lib | C:¥APW¥jbk3¥jdk¥lib¥ | /opt/FJSVawjbk/jdk13/lib/ |
| jswatch | apwclasses | C:¥APW¥classes¥ | /opt/FJSVjs2/classes/ |
| jswatch | port | port=8009 | port=9001 |
| jswatch | userapl | C:¥webapl¥classes¥ | /home/webapl/user/classes/ |

FIG.5

| LOCATION IDENTIFIER | CONVERSION FLAG | STORAGE DIRECTORY NAME | FILE NAME |
|---|---|---|---|
| javaexe | no | /opt/FJSVawjbk/jdk13/bin | java |
| jdktool | no | /opt/FJSVawjbk/jdk13/lib | tools.jar |
| js | no | /opt/FJSVjs2/classes | js13022.jar |
| servlet | no | /opt/FJSVjs2/classes | servlet22.jar |
| xml | no | /opt/FJSVjs2/classes | xml.jar |
| jcontainer | no | /etc/opt/FJSVjs2 | jscontainer.xml |
| usr_pgm | no | /home/webapl/classes | zaiko.jar |
| usr_data | no | /home/webapl/data | test.dat |
| jswatch | yes | /home/webapl/opt/FJSVjs2 | jswatch.conf |
| PARAMDEF | no | /home/webapl/def | paramdef.txt |

```
sample.port=8009
sample.containerconf=C:¥APW¥classes¥jscontainer.xml
sample.bin=C:¥APW¥jbk3¥jdk¥bin¥java
sample.env=CLASSPATH=C:¥APW¥jbk3¥jdk¥lib¥tools.jar
sample.env=CLASSPATH=C:¥APW¥classes¥js13022.jar
sample.env=CLASSPATH=C:¥webapl¥classes¥zaiko.jar
sample.env=CLASSPATH=C:¥APW¥classes¥servlet22.jar
sample.env=CLASSPATH=C:¥APW¥classes¥xml.jar
sample.env=THREADS_FLAG=native
sample.ha.shutdown=false
```

FIG.7A

```
sample.port=9001
sample.containerconf=/etc/opt/FJSVjs2/jscontainer.xml
sample.bin=/opt/FJSVawjbk/jdk13/bin/java
sample.env=CLASSPATH=/opt/FJSVawjbk/jdk13/lib/tools.jar
sample.env=CLASSPATH=/opt/FJSVjs2/classes/js13022.jar
sample.env=CLASSPATH=/home/webapl/user/classes/zaiko.jar
sample.env=CLASSPATH=/opt/FJSVjs2/classes/servlet22.jar
sample.env=CLASSPATH=/opt/FJSVjs2/classes/xml.jar
sample.env=THREADS_FLAG=native
sample.ha.shutdown=false
```

FIG.7B

METHOD, APPARATUS, AND PROGRAM FOR CONSTRUCTING AN EXECUTION ENVIRONMENT, AND COMPUTER READABLE MEDIUM RECORDING PROGRAM THEREOF

BACKGROUND OF THE INVENTION

1. Field of the Invention

This invention relates to a distributed development support technique for application programs. More particularly, the present invention relates to an execution environment constructing method and an execution environment constructing program in which an execution environment setting file of a program in a program development server is automatically converted into an execution environment setting file in a connection test server, in the case where the program development and the connection test are made in different servers.

2. Description of the Related Art

Conventionally, when the program development and the connection test were made in different servers, a source program of developed program was transferred off line from the program development server to the connection test server, where the source program was compiled and linked, and an execution environment setting file for enabling the compiled and linked program to be operated in the connection test server was defined in accordance with the connection test server, whereby a connection test environment was newly created mainly manually. The execution environment setting file is a file defining the execution environment parameters required for executing a software program.

Also, conventionally, when the program development server was in a remote site and a developer lives in the remote site, the developer often had to come to a place where the connection test server was installed to modify errors arising in the connection test and to make a test in the connection test server.

In recent years, with the advent of JAVA (Registered Trademark of Sun Microsystems, Inc.), the program development not dependent on a platform that is an environment in operating the program has been allowed. Particularly in the field of a WEB application, with the advent of Servlet, JSP (Java server pages) and JDBC (Java database connectivity), the application development not dependent on the WEB server and RDB (relational database), in addition to the platform, has been allowed.

Along with the spread of the Internet and the progress of security technologies, there has been an attempt in which a JAVA program is developed in the program development server in the remote site, including the overseas. Then, a JAVA bite code (JAVA program) not dependent on the platform and an execution environment setting file of the program development server are file transferred to the connection test server where the connection test is made.

However, with the prior art, it was required to manually change an application file name, a data file name, an execution environment setting file storage directory name, and a JAVA install directory name, which are described in the execution environment setting file, into those for the connection test server. Also, for the WEB application, it was required to manually change a URL name, a host name, and a port number into those for the connection test server. Therefore, the following problems arose.

(1) When the execution environment setting file of the program development server is changed to the execution environment setting file of the connection test server, it is difficult to change the execution environment setting file in the connection test server, if the execution environment of the program development server is unknown. Also, it is difficult for the program development server to change the execution environment setting file in accordance with the connection test server, if the execution environment of the connection test server is unknown.

(2) In manually changing the execution environment setting file, if there is a great number of execution environment setting files or change items, the amount of workload of modifying operation will be increased by taking a lot of time to make a change process, and a change error will be easily caused. Moreover, since the change error is unknown before the connection test is performed, it takes a lot of time until the error correction is ended and the connection test is ready.

(3) When the program development server is in a remote site and the developer also lives in a remote site, the developer has to come to the place where the test server is installed in order to modify errors caused owing to the execution environment and make the test, when the connection test is made in the connection test server. Therefore, the time for the developer to move to the place as well as the time for the modification of errors and the test are required, and the expense for the developer to move from the remote site is needed.

SUMMARY OF THE INVENTION

The present invention has been achieved to solve the above-mentioned problems of the prior art in modifying the execution environment setting file, and it is an object of the invention to provide a technology for automatically converting the execution environment setting file without changing it manually to take a lot of time and cause many errors.

To accomplish the above object, this invention prepares a parameter conversion identification file defining the parameter description for the execution environment setting file for each of the program development server and the connection test server. When converting the execution environment file of the program development server to the execution environment file of the connection test server, a parameter conversion table is created by collating the parameter conversion identification files for both the servers, and an execution environment setting file is automatically converted using the parameter conversion table.

Also, a program, data, an execution environment setting file and a parameter conversion identification file are transferred as a temporary file, which is created under the temporary directory, from the program development server to the connection test server, where each file is copied into a directory designated by a location identification file prepared on the connection test server.

More specifically, in the connection test server, the program acquired from the program development server, the execution environment setting file storing information of execution environment for that program in the program development server, and a parameter conversion setting file storing definition information of the parameter description for the execution environment setting file in the program development server are acquired. And the parameter conversion table describing the conversion information of the execution environment setting file is created from the parameter conversion setting file acquired from the program development server. And the parameter conversion setting file storing the definition information of the parameter description for the execution environment setting file in the program development server, and the execution environment setting file acquired from the program development server is automatically converted into the execution environment setting file in the connection test server, on the basis of the information of that parameter conversion table.

Employing a location identification file storing the location identification information defined commonly in the program development server and the connection test server, and the associated information between the directory information for storing the file in the connection test server and the file name for use in the connection test server, each file acquired from the program development server is copied into a directory defined in the location identification file with a file name defined in the location identification file.

The above processes can be implemented using a computer and a software program. The software program is stored in a suitable recording medium, such as a portable medium memory, a semiconductor memory, or a hard disk, which is readable by the computer.

BRIEF DESCRIPTION OF THE DRAWINGS

FIGS. 2A and 2B are tables showing an environment example of each server in this embodiment.

FIG. 3 is a table exemplifying a location identification file for the program development server in this embodiment.

FIGS. 4A and 4B are tables exemplifying a parameter conversion identification file in this embodiment.

FIG. 5 is a table exemplifying a parameter conversion table in this embodiment.

FIG. 6 is a table exemplifying a location identification file for the connection test server in this embodiment.

FIGS. 7A and 7B are lists exemplifying an execution environment setting file in this embodiment.

DETAILED DESCRIPTION OF THE PREFERRED EMBODIMENT

Figure 1:
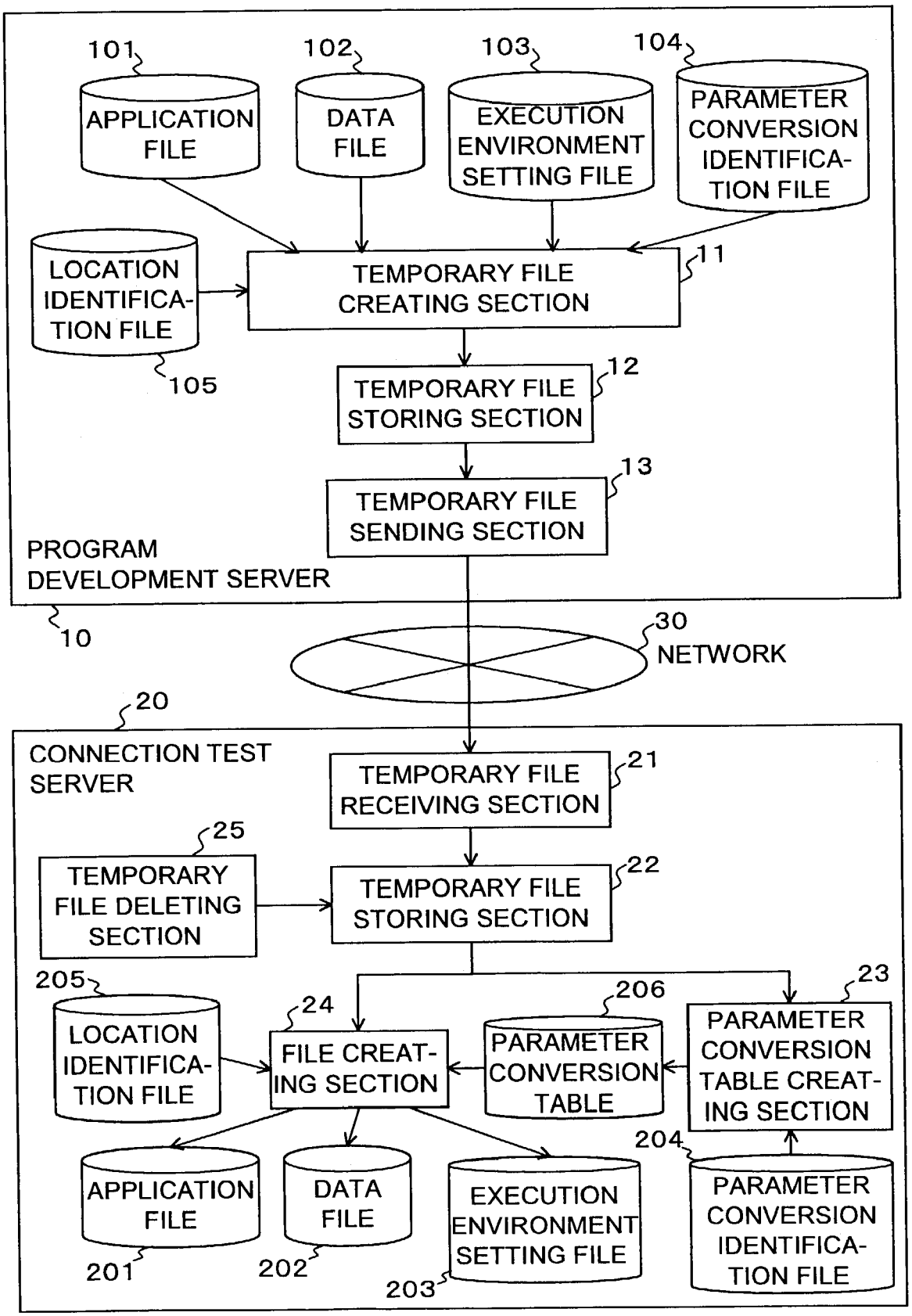
FIG. 1 is a block diagram showing a configuration example of a system that implements the present invention.

A preferred embodiment of the present invention will be described below with reference to the accompanying drawings. FIG. 1 is a block diagram showing a configuration example of a system that implements the present invention. In this embodiment, an application program developed in a program development server 10 is subjected to a connection test in a connection test server 20. The application program developed in the program development server 10 is transferred to the connection test server 20 via a network 30 such as the Internet. The program development server 10 and the connection test server 20 are in mutually different execution environments.

FIGS. 2A and 2B are tables showing an environment example of each server in this embodiment. FIG. 2A is an environment example of the program development server 10 in this embodiment, using the Windows NT made by Microsoft Inc. as the operating system. FIG. 2B is an environment example of the connection test server 20 in this embodiment, using the Solaris made by Sun Microsystems Inc. as the OS. The program environments to be treated are the Java environment and the Servlet environment, which are common to both the servers.

The program development server 10 is a computer consisting of a CPU and a memory, and comprises a temporary file creating section 11, a temporary file storing section 12 and a temporary file sending section 13, which are configured by the software programs. The connection test server 20 is a computer consisting of a CPU and a memory, and comprises a temporary file receiving section 21, a temporary file storing section 22, a parameter conversion table creating section 23, a file creating section 24, and a temporary file deleting section 25, which are configured by the software programs.

The program development server 10 has an application file 101 and a data file 102 that are already developed, and an execution environment setting file 103 storing information of an execution environment for the application file and the data file on the program development server 10. To copy the program, data and the execution environment from the program development server 10 to the connection test server 20 and change them for the execution environment for the connection test server 20, a parameter conversion identification file 104 storing the definition of parameter description within the execution environment setting file 103 is also prepared. Also, a location identification file 105 storing a storage directory of each file on the program development server 10 is prepared.

In the connection test server 20, a parameter conversion identification file 204 storing the definition of parameter description for an execution environment setting file 203 for the connection test server 20 is prepared. Also, a location identification file 205 storing the storage directory of each file transferred from the program development server 10 on the connection test server 20 is prepared.

In the program development server 10, the temporary file creating section 11 reads each of the application file 101, the data file 102, the execution environment setting file 103, and the parameter conversion identification file 104 from the storage directory in the order of records described in the location identification file 105. Each read file is copied to the temporary file storing section 12 that is a temporary directory in the program development server 10 as a temporary file (which is created under the temporary directory) having a file name of a location identifier described in the location identification file 105. The temporary file sending section 13 sends each temporary file in the temporary file storing section 12 to the connection test server 20.

FIG. 3 is a table exemplifying the location identification file 105 in the program development sever 10 in this embodiment. In the program development server 10, each file described in a file name field of the location identification file 105 is stored in each directory described in a storage directory field. A location identifier is a file name of a temporary file when the file is temporary file. This location identifier is defined commonly in the program development server 10 and the connection test server 20. A conversion flag field indicates whether or not it is required to change the contents of the file when the execution environment is changed. In FIG. 3, it is necessary that the contents of the file are changed if the conversion flag is "yes", while it is unnecessary that the contents are changed if the conversion flag is "no".

In the connection test server 20, the temporary file receiving section 21 receives each temporary file from the program development server 10, and stores it in the temporary file storing section 22 that is a temporary directory in the connection test server 20. The parameter conversion table creating section 23 creates a parameter conversion table 206 by discriminating a temporary file of the parameter conversion identification file 104 in the program development server 10 from the temporary files of the temporary file storing section 22 in terms of the location identifier, and collating it with the parameter conversion identification file 204 in the connection test server 20.

FIGS. 4A and 4B are tables exemplifying the parameter conversion identification files in this embodiment. FIG. 4A is an example of the parameter conversion identification file 104 in the program development server 10, and FIG. 4B is an example of the parameter conversion identification file 204 in the connection test server 20. In FIGS. 4A and 4B, a location identifier field indicates a location identifier (file name in temporary file) of a file subject to conversion, and a parameter field indicates a parameter to be converted.

A parameter identifier field is a field recording an identifier for associating the parameter of FIG. 4A and the parameter of FIG. 4B. For example, there is an association in which the parameter "port=8009" for the parameter identifier "port" in FIG. 4A is converted to the parameter "port=9001" for the parameter identifier "port" in FIG. 4B.

FIG. 5 is a table exemplifying the parameter conversion table 206 in this embodiment. This parameter conversion table 206 associates the parameters having the same location identifier and parameter identifier in the parameter conversion identification files 104 and 204 of FIGS. 4A and 4B, and is created by extracting the program development server parameter from FIG. 4A and the connection test server parameter from FIG. 4B. In the file indicated by the location identifier, the parameter described in the program development server parameter field is converted into the parameter described in the connection test server parameter field.

FIG. 6 is a table exemplifying the location identification file 205 in the connection test server 20 in this embodiment. Each temporary file with conversion flag of "no" is stored in a designated storage directory with a designated file name without conversion by the file creating section 24. A temporary file "jswatch" of the execution environment setting file 103 with conversion flag of "yes" is converted in accordance with the parameter conversion table 206 as shown in FIG. 5, and is stored in a directory "/home/webap1/opt/FJSVjs2" as the execution environment setting file 203 with a file name "jswatch.conf".

The file creating section 24 stores each temporary file within the temporary file storing section 22 in a designated storage directory with a designated file name in accordance with the location identification file 205 in the connection test server 20. Then, the file with conversion flag of "no" is stored without conversion, while the file with conversion flag of "yes" is stored after conversion by referring to the parameter conversion table 206. In this manner, the application file 201, the data file 202, and the execution environment setting file 203 that are executable in the connection test server 20 are automatically set up in the connection test server 20.

FIGS. 7A and 7B are lists exemplifying the execution environment setting files in this embodiment. FIG. 7A is an example of the execution environment setting file 103 in the program development server 10, and FIG. 7B is an example of the execution environment setting file 203 in the connection test server 20. In the file creating section 24, a temporary file of the execution environment setting file 103 in FIG. 7A is turned into the execution environment setting file 203 in FIG. 7B, since the parameter described in the program development server parameter in the parameter conversion table 206 in FIG. 5 is converted into the parameter described in the connection test server parameter at the same line in the parameter conversion table 206 in FIG. 5.

The temporary file deleting section 25 deletes all unnecessary temporary files within the temporary file storing section 22, after the file creation by the file creating section 24 is completely ended.

Figure 8:
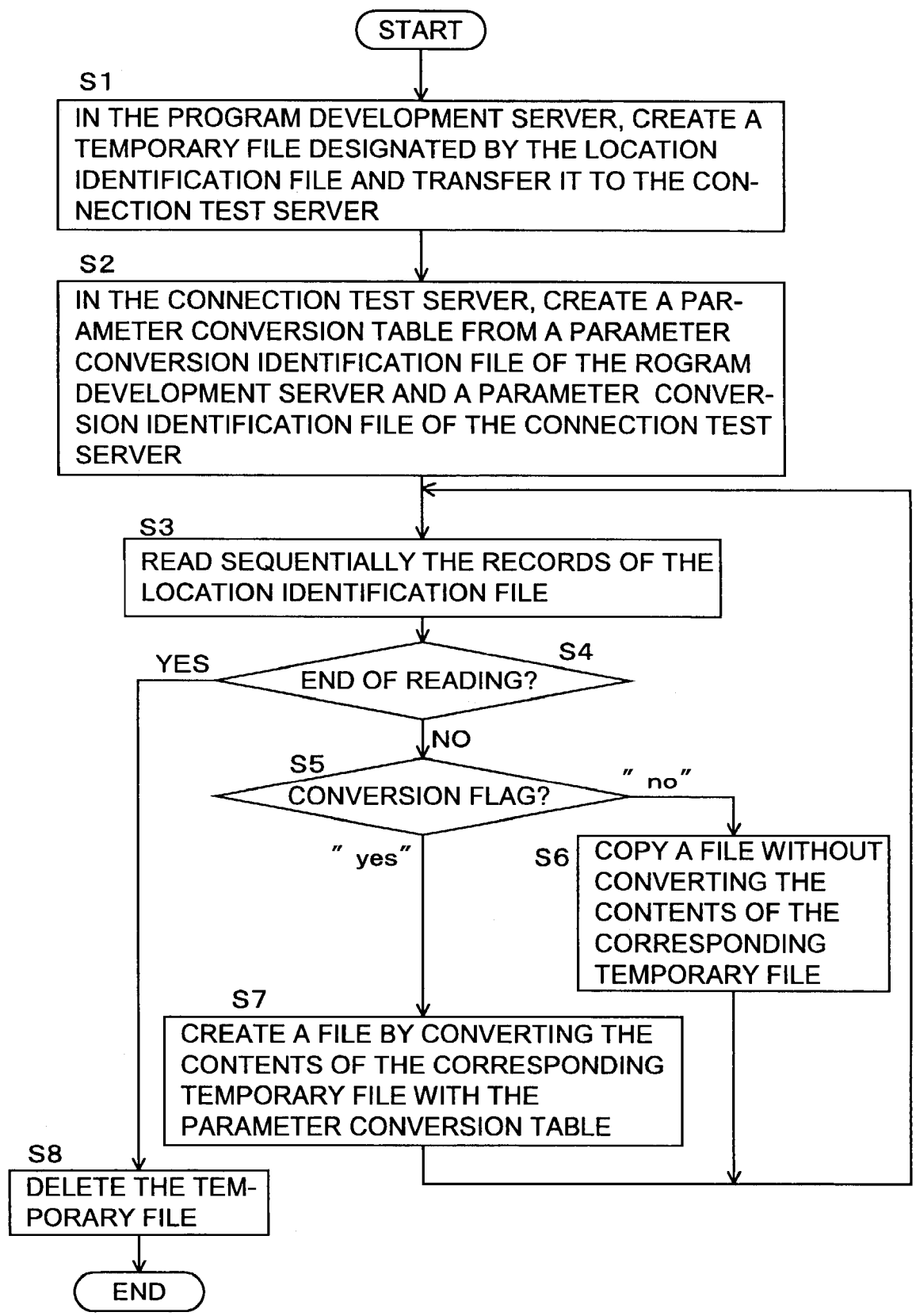
FIG. 8 is a processing flowchart of the system in this embodiment.

FIG. 8 is a processing flowchart of the system in this embodiment. First, in the program development server 10, the temporary file creating section 11 creates a temporary file with a file name of a location identifier designated in the location identification file 105 for each file to be transferred. Then, the temporary file sending section transfers the temporary file to the connection test server 20 (step S1). In this example, the temporary file is created for each file to be transferred, and then individually transferred. However, a plurality of temporary files may be collectively compressed and transferred, using an existing archive. The cost of transfer can be reduced with compressing the plurality of files.

In the connection test server 20, the temporary file receiving section 21 stores each temporary file received from the program development server 10 in the temporary file storing section 22. Then, the parameter conversion table creating section 23 extracts a temporary file of the parameter conversion identification file 104 by confirming the location identifier, and creates a parameter conversion table 206 from the temporary file and the parameter conversion identification file 204 of the connection test server 20 (step S2).

The file creating section 24 reads sequentially the records of the location identification file 205 (step S3). If reading of all the records is ended, the process jumps to step S8 (step S4). If one record is read, the file creating section 24 confirms a conversion flag field of that record (step S5). If the conversion flag is "no", the file creating section 24 copies a temporary file indicated by the location identification field of the record in a directory indicated by the storage directory field of the record with a file name indicated by the file name field of the record (step S6), and then the process returns to step S3.

At step S5, if the conversion flag field of the record is "yes", the file creating section 24 converts the contents of the temporary file indicated by the location identifier field of the record in accordance with the parameter conversion table 206, and copies the converted temporary file in a directory indicated by the storage directory field of the record with a file name indicated by the file name field of the record (step S7). Then, the process returns to step S3. If reading of the records is ended (step S4), the temporary file deleting section 25 deletes the temporary file stored in the temporary file storing section 22 (step S8), and the process is ended.

Figure 9:
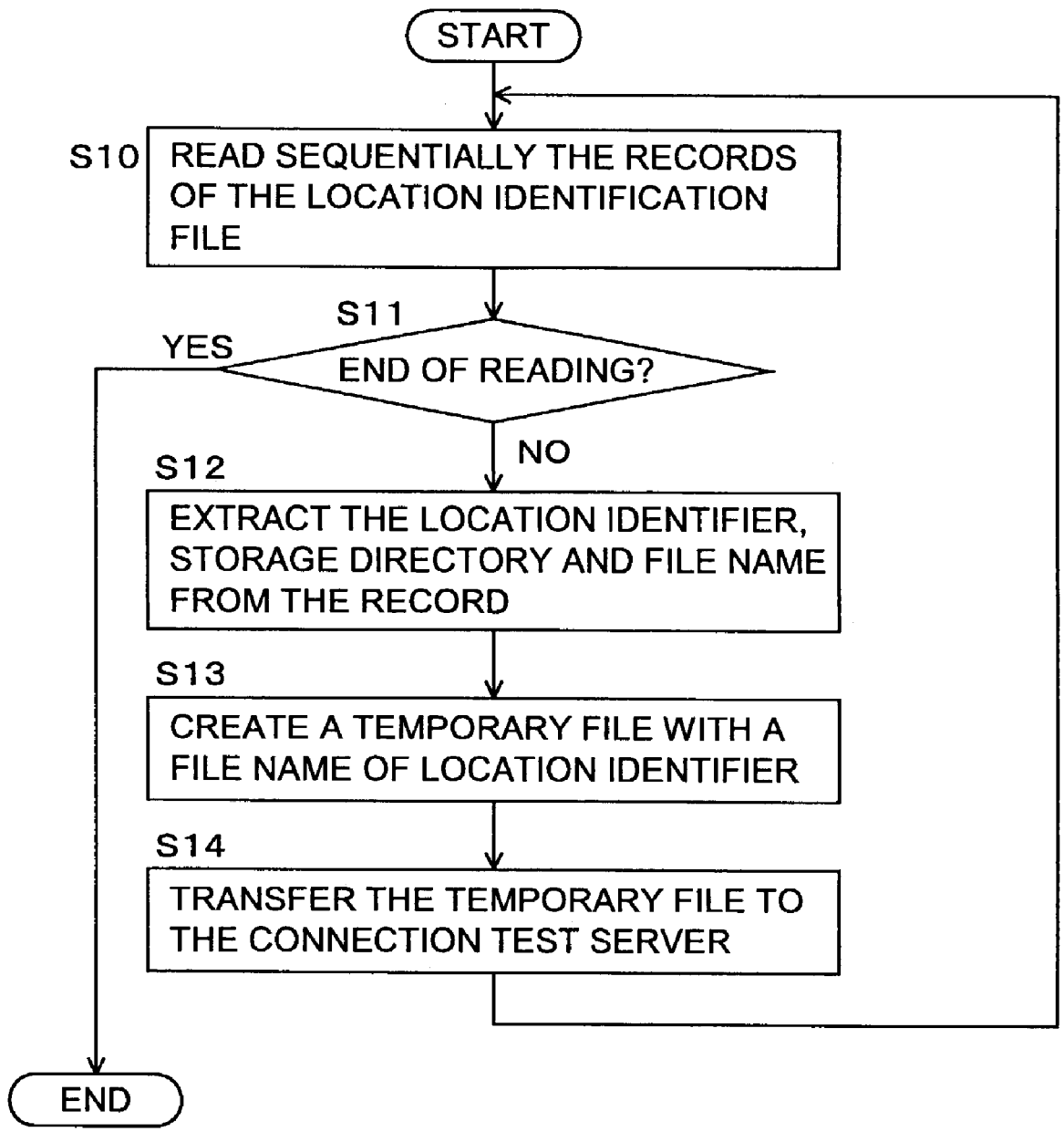
FIG. 9 is a flowchart of a file transfer process in this embodiment.

The above processes will be further described below with reference to a detailed flowchart. FIG. 9 is a flowchart of a file transfer processing in this embodiment. In the program development server 10, the temporary file creating section 11 reads sequentially the records of the location identification file 105 (step S10). If reading of the records is ended, the transfer process is ended (step S11). If one record is read, the location identifier, the temporary file creating section 11 extracts the storage directory and the file name from the read record (step S12), and copies a file indicated by the extracted file name from the directory indicated by the extracted storage directory to the temporary file storing section 12 as a temporary file with a file name of the location identifier (step S13). The temporary file sending section 13 transfers the temporary file to the connection test server 20 (step S14), and the process returns to step S10. The above processes are repeated until reading of the records in the location identification file 105 is ended.

Figure 10A:
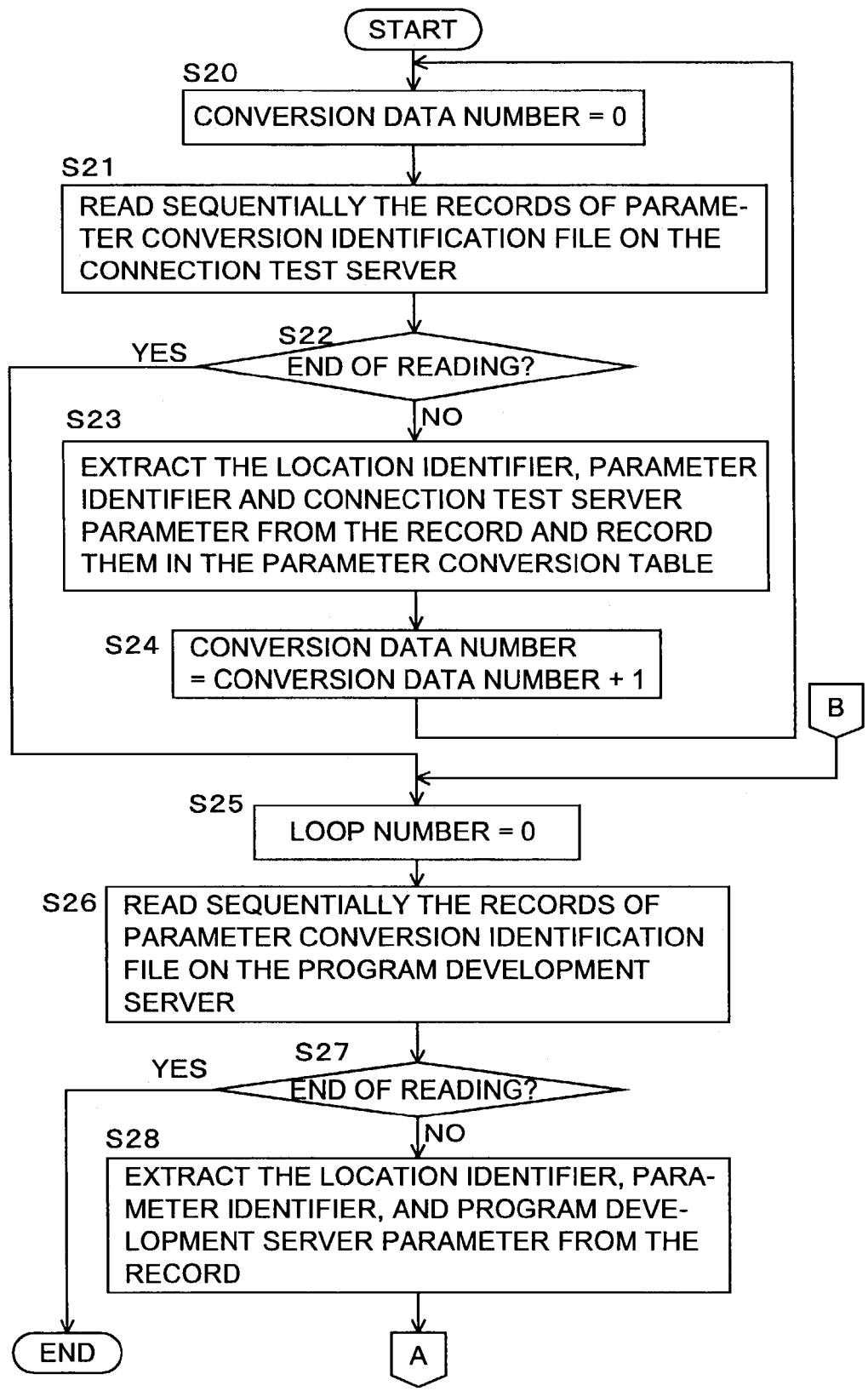
FIGS. 10A and 10B are flowcharts of a parameter conversion table creating process in this embodiment.
Figure 10B:
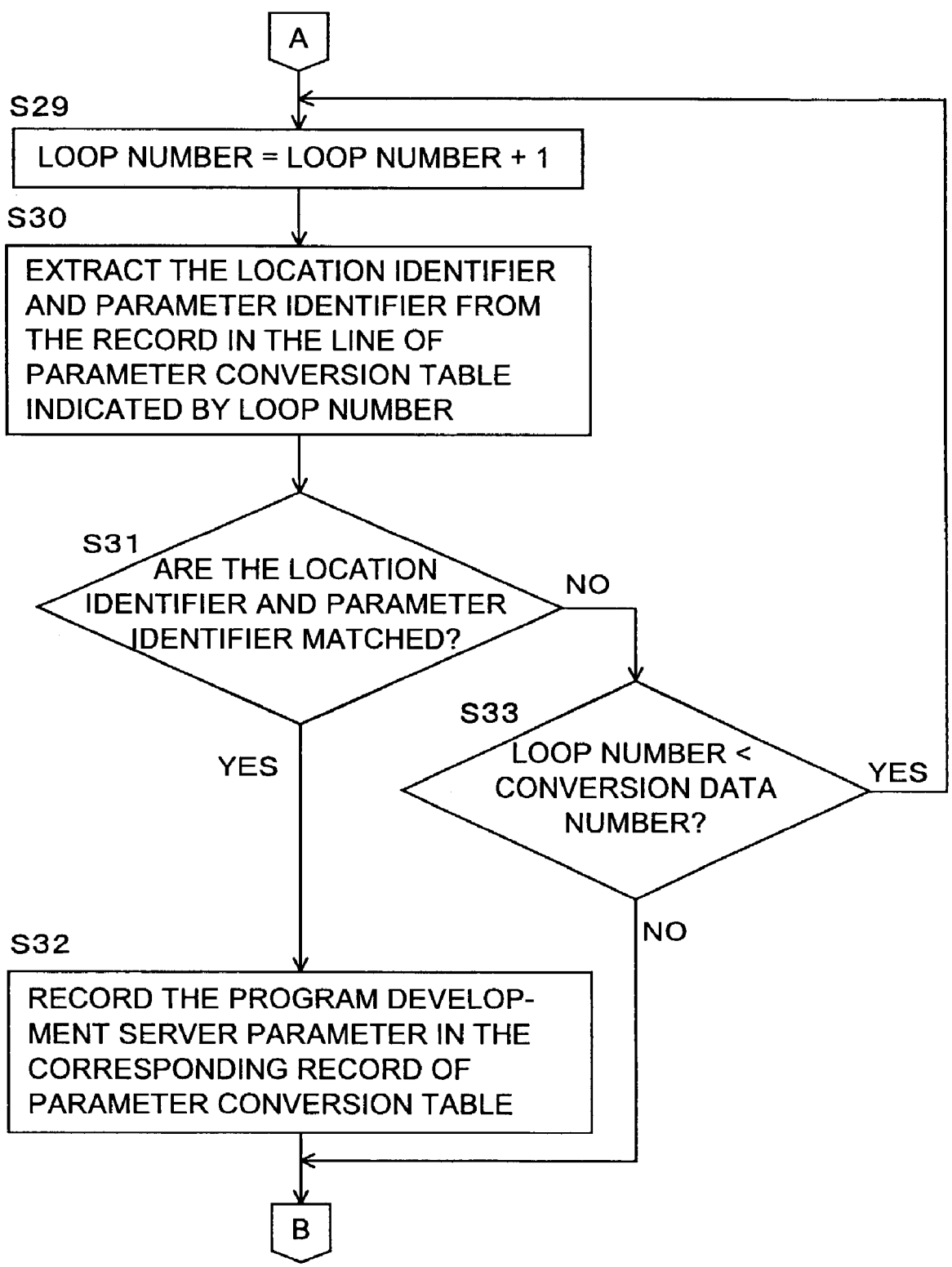

FIGS. 10A and 10B are flowcharts for creating the parameter conversion table in this embodiment. In the connection test server 20, the parameter conversion table creating section 23 initializes a counter of the number of conversion data (the number of entries in the parameter conversion table 206) in the parameter conversion table 206 to zero (step S20). The parameter conversion table creating section 23 sequentially reads the records of the parameter conversion identification file 204 on the connection test server 20 (step S21). Until reading of the records is ended (step S22), The parameter conversion table creating section 23 extracts the location identifier, the parameter identifier, and the parameter (connection test server parameter) from the read record, and records them in the parameter conversion table 206 (step S23). The conversion data number counter in the parameter conversion table 206 is incremented by one (step S24), and the process returns to step S21.

If reading of all the records is ended (step S22), a loop number counter is initialized to zero (step S25). This loop number is employed as an index value specifying the record position in the parameter conversion table 206 in the following processing.

Then, the file creating section 24 reads sequentially the records from the temporary file of the parameter conversion identification file 104 on the program development server 10 in the temporary file storing section 22 (step S26). If reading of all the records is ended (step S27), the process is ended. If one record is read, the file creating section 24 extracts the location identifier, the parameter identifier and the parameter (program development server parameter) from the read record (step S28). The loop number counter is incremented by one (step S29). And, the file creating section 24 extracts the location identifier and the parameter identifier of the record in the line of the parameter conversion table 206 indicated by the loop number (step S30).

Subsequently, the file creating section 24 determines whether or not the location identifier and the parameter identifier extracted at step S28 are matched with the location identifier and the parameter identifier extracted at step S30 (step S31). If matched, the file creating section 24 adds the parameter (program development server parameter) extracted at step S28 to the record in the line of the parameter conversion table 206 indicated by the loop number (step S32), and then the process returns to step S25.

If unmatched at step S31, the file creating section 24 compares the loop number and the conversion data number (step S33). If the loop number is less than the conversion data number, the process returns to step S29, while if the loop number is greater than or equal to the conversion data number, the process returns to step S25.

Figure 11:
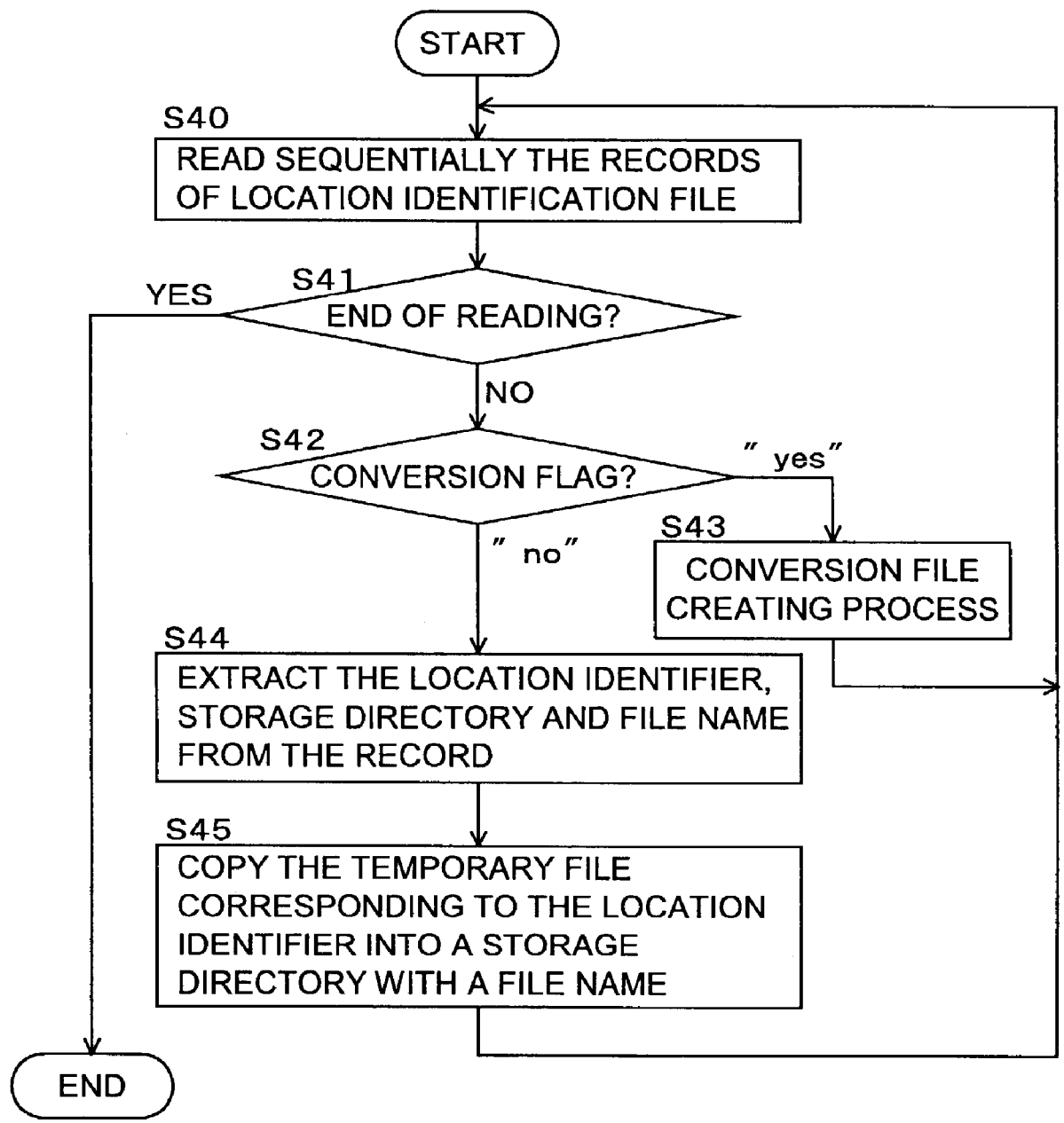
FIG. 11 is a flowchart of a file creating process in this embodiment.

FIG. 11 is a flowchart of a file creating process in this embodiment. First, the file creating section 24 reads sequentially the records of the location identification file 205 on the connection test server 20 (step S40). If reading of all the records is ended (step S41), the process is ended.

If one record is read, the file creating section 24 confirms a conversion flag of the read record (step S42). If the conversion flag is "yes", a conversion file creating process is made (step S43, detailed below with reference to FIG. 12), and the process returns to step S40.

At step S42, if the conversion flag is "no", the file creating section 24 extracts the location identifier, the storage directory and the file name from the read record (step S44), and copies a temporary file in the temporary file storing section 22 corresponding to the extracted location identifier in the extracted storage directory with the extracted file name (step S45), and the process returns to step S40.

Figure 12:
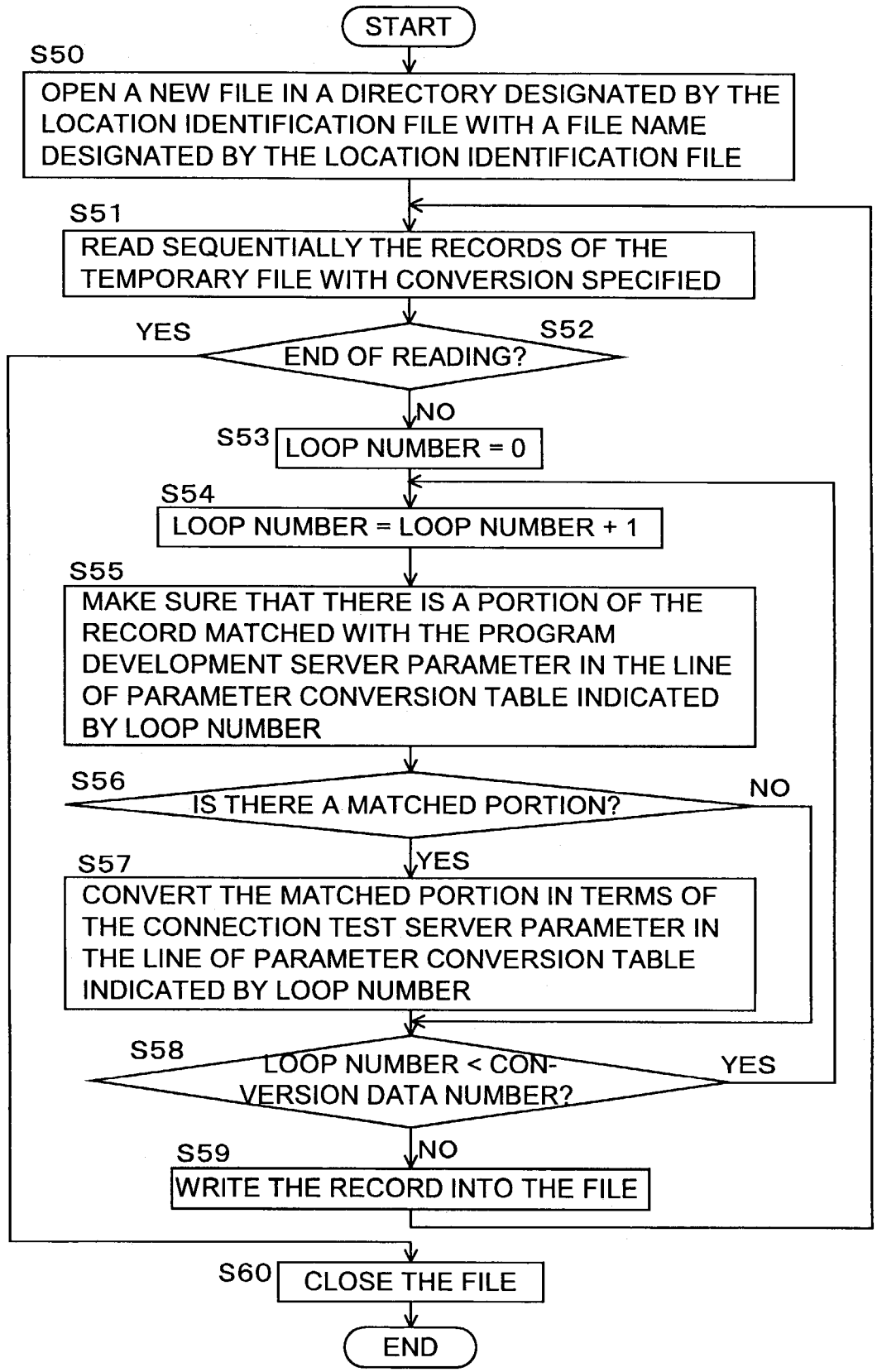
FIG. 12 is a flowchart of a conversion file creating process in this embodiment.

FIG. 12 is a flowchart of a conversion file creating process in this embodiment. A new file is opened with a designated file name in a storage directory designated by the location identification file 205 (step S50). The file creating section 24 reads sequentially the records of the temporary file with the conversion specified (step S51). If reading of all the records is ended (step S52), the process jumps to step S60. If one record is read, a loop number (index value specifying the record position in the parameter conversion table 206) counter is initialized to zero (step S53). And, the loop number counter is incremented by one (step S54).

Then, the file creating section 24 determines whether or not there is a portion in a character string of the record read at step S52 that is matched with the program development server parameter in the line of the parameter conversion table 206 indicated by the loop number (step S55). If there is a matched portion (step S56), the file creating section 24 converts the corresponding character string by the connection test server parameter in the line of the parameter conversion table 206 indicated by the loop number (step S57). The file creating section 24 compares the loop number and the conversion data number that is the number of records in the parameter conversion table 206 (step S58), and if the loop number is less than the conversion data number, the process returns to step S54.

At step S58, if the loop number is greater than or equal to the conversion data number, the file creating section 24 writes the record in the file opened at step S50 (step S59), and the process returns to step S51. At step S56, if there is no matched portion, the process jumps to step S58. At step S52, if reading of all the records is ended, the file opened at step S50 is closed (step S60), and the process is ended.

Figure 13:
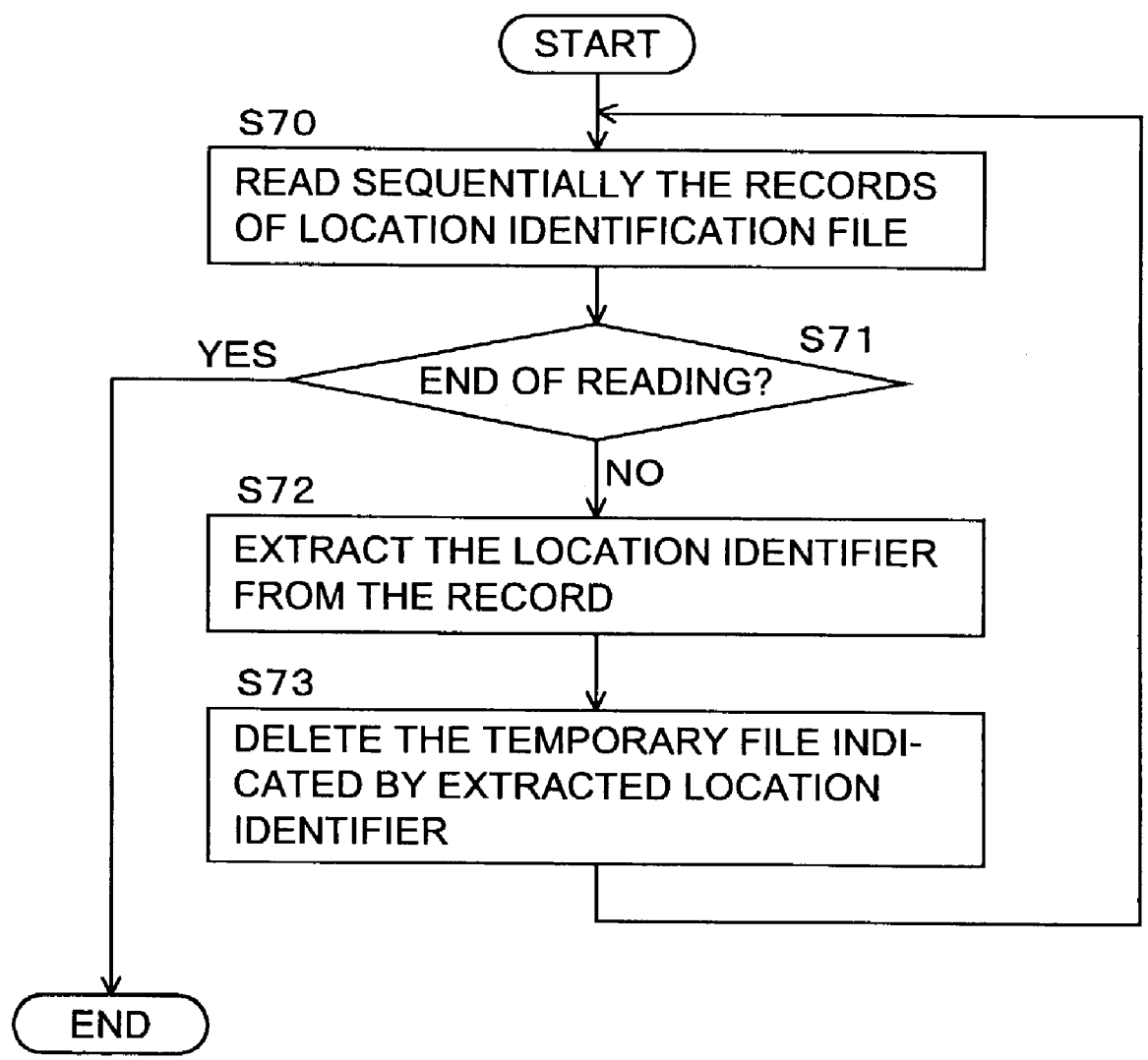
FIG. 13 is a flowchart of a temporary file deleting process in this embodiment.

FIG. 13 is a flowchart of a temporary file deleting process in this embodiment. The temporary file deleting section 25 reads sequentially the records of the location identification file 205 on the connection test server 20 (step S70). If reading of all the records is ended (step S71), the process is ended.

If one record is read, the temporary file deleting section 25 extracts the location identifier from the read record (step S72), and deletes the temporary file with a file name of the extracted location identifier from the temporary file storing section 22 (step S73), and the process returns to step S70.

In the above embodiment, an instance where the program and the execution environment are transferred from the program development server 10 to the connection test server 20 has been described. However, the present invention is also applicable to an instance where the file and the execution environment are transferred from the program development server 10 or the connection test sever 20 to another processing unit, whereby the execution environment can be automatically constructed.

As described above, with the present invention, there is no need for manually creating or changing the execution environment setting file in the connection test server, whereby it is possible to shorten the preparation time for the connection test. Also, because there is less error caused by manually changing the execution environment, it is easier to investigate an abnormal cause than conventionally, if a nonconformity takes place in the connection test, especially when the program development server and the developer are in the remote site away from the connection test server. The developer does not need to take an official trip to the remote site where the connection test server is installed by utilizing a network such as the Internet, as needed.

Also, in an instance where the program and the execution environment setting file are transferred from the program development server or the connection test server to other plural processing units in different execution environments, the processing units on the receiving side can automatically convert the execution environment setting file only by preparing the parameter conversion identification file appropriate for the processing units of theirs, without knowing the execution environment of apparatus on the transferring side, and thereby easily construct the execution environment.

What is claimed is:

1. A method for automatically constructing an execution environment for a program, comprising:

acquiring, by a first apparatus, at least the program and an execution environment setting file defining the program execution environment parameters from a second apparatus;

acquiring, by the first apparatus, parameter conversion identification files of the first apparatus and the second apparatus, each parameter conversion identification file storing a parameter identifier identifying each execution environment parameter defined commonly in the first apparatus and the second apparatus, and an execution environment parameter used in the second apparatus corresponding to each parameter identifier;

creating, by the first apparatus, a parameter conversion table converting the execution environment parameter used in the second apparatus into the execution environment parameter for use in the first apparatus, based on the acquired parameter conversion identification files; and converting, by the first apparatus, the execution environment parameter of the execution environment setting file acquired from the second apparatus into the execution environment parameter suitable for the first apparatus to create an execution environment setting file for the first apparatus, on the basis of the parameter conversion table.

2. The method according to claim 1, further comprising:
    copying the execution environment setting file acquired from the second apparatus into a directory defined in a location identification file with a file name defined in the location identification file, in which the location identification file storing location identification information defined commonly in the first apparatus and the second apparatus, and associated information between directory information for storing the execution environment setting file in the first apparatus and a file name for use in the first apparatus.

3. An apparatus comprising a processor for automatically constructing an execution environment for a program, comprising:

means for acquiring, by a first apparatus, at least the program and an execution environment setting file defining the program execution environment parameters from a second apparatus;

means for acquiring, by the first apparatus, parameter conversion identification files of the first apparatus and the second apparatus, each parameter conversion identification file storing a parameter identifier identifying each execution environment parameter defined commonly in the first apparatus and the second apparatus, and the execution environment parameter used in the second apparatus corresponding to each parameter identifier;

means for creating, by the first apparatus, a parameter conversion table converting the execution environment parameter used in the second apparatus to the execution environment parameter for use in the first apparatus, based on the acquired parameter conversion identification files; and means for converting, by the first apparatus, the execution environment parameter of the execution environment setting file acquired from the second apparatus into the execution environment parameter suitable for the first apparatus to create an execution environment setting file for the first apparatus, on the basis of the parameter conversion table.

4. The apparatus according to claim 3, further comprising:
    a location identification file storing location identification information defined commonly in the first apparatus and the second apparatus, and associated information between directory information for storing the parameter conversion identification files in the first apparatus and a file name for use in the first apparatus; and
    means for copying each parameter conversion identification file acquired from the second apparatus into a directory defined in the location identification file with a file name defined in the location identification file.

5. An apparatus to automatically construct an execution environment for a program, comprising:
    a first server;
    a second server:
        acquiring from the first server, at least the program and an execution environment setting file defining the program execution environment parameters from a second apparatus;
        acquiring parameter conversion identification files of the first server and the second server, each parameter conversion identification file storing a parameter identifier identifying each execution environment parameter defined commonly in the first server and the second server, and an execution environment parameter used in the second server corresponding to each parameter identifier;
        creating a parameter conversion table converting the execution environment parameter used in the first server into the execution environment parameter for use in the second server, based on the acquired parameter conversion identification files; and
        converting the execution environment parameter of the execution environment setting file acquired from the first server into the execution environment parameter suitable for the second server to create an execution environment setting file for the second server, on the basis of the parameter conversion table.

6. A computer readable storage medium recording a program for enabling a computer to perform a method for automatically constructing an execution environment for a program, the method comprising:

acquiring, by a first apparatus, at least the program and an execution environment setting file defining the program execution environment parameters from a second apparatus;

acquiring, by the first apparatus, parameter conversion identification files of the first apparatus and the second apparatus, each parameter conversion identification file storing a parameter identifier identifying each execution environment parameter defined commonly in the first apparatus and the second apparatus, and an execution environment parameter used in the second apparatus corresponding to each parameter identifier;

creating, by the first apparatus, a parameter conversion table converting the execution environment parameter used in the second apparatus into the execution environment parameter for use in the first apparatus, based on the acquired parameter conversion identification files; and converting, by the first apparatus, the execution environment parameter of the execution environment setting file acquired from the second apparatus into the execution environment parameter suitable for the first apparatus to create an execution environment setting file for the first apparatus, on the basis of the parameter conversion table.

* * * * *